United States Patent [19]

Ducote

[11] Patent Number: 4,740,006
[45] Date of Patent: Apr. 26, 1988

[54] REMOTE-CONTROL STEERING SYSTEM

[76] Inventor: Edgar A. Ducote, 4065 Strand Dr., Baton Rouge, La. 70809

[21] Appl. No.: 782,483

[22] Filed: Oct. 1, 1985

[51] Int. Cl.⁴ .......................................... B62D 13/04
[52] U.S. Cl. ................................... 280/426; 280/442
[58] Field of Search .............. 280/405 A, 419, 423 R, 280/426, 442, 443, 400; 180/134, 137, 138, 139

[56] References Cited

U.S. PATENT DOCUMENTS

| | | | |
|---|---|---|---|
| 1,619,941 | 3/1927 | Kennedy | 280/426 |
| 2,286,166 | 6/1942 | Carmody | 280/426 |
| 2,925,285 | 2/1960 | Haas | 280/426 |
| 2,959,428 | 11/1960 | Felburn | 280/426 |
| 3,092,398 | 6/1963 | Droeske | 280/426 |
| 3,149,858 | 9/1964 | Gilbert | 280/442 |
| 3,533,644 | 10/1970 | Humes | 280/426 |
| 3,712,641 | 1/1973 | Sherman | 280/426 |
| 3,734,538 | 4/1973 | Humes | 280/426 |
| 4,017,094 | 4/1977 | Pilcher | 280/404 |
| 4,120,509 | 10/1978 | Reeve | 280/81 A |
| 4,244,596 | 1/1981 | Chung | 280/426 |
| 4,441,730 | 4/1984 | Damm | 280/426 |
| 4,463,966 | 8/1984 | Stoddard | 280/442 |
| 4,468,047 | 8/1984 | McGhie | 280/419 |

FOREIGN PATENT DOCUMENTS

| | | | |
|---|---|---|---|
| 1957662 | 5/1971 | Fed. Rep. of Germany | 280/442 |
| 2200739 | 7/1973 | Fed. Rep. of Germany | 280/426 |
| 2312565 | 9/1974 | Fed. Rep. of Germany | 280/426 |
| 94330 | 4/1960 | Netherlands | 280/426 |
| 556066 | 6/1977 | U.S.S.R. | 280/442 |
| 765083 | 9/1980 | U.S.S.R. | 180/134 |

OTHER PUBLICATIONS

McGraw-Hill, Encyclopedia of Science and Technology, vol. 1, pp. 56, 746, 753, 755; vol. 3, p. 451; vol. 5, p. 526; vol. 13, pp. 110–112, New York: McGraw-Hill Book Co., 1977.
Encyclopaedia Britannica, vol. 18, pp. 721–723, Chicago: Encyclopaedia Britannica, Inc., 15th Edition.

Primary Examiner—John J. Love
Assistant Examiner—Everett G. Diederiks, Jr.
Attorney, Agent, or Firm—Reginald F. Roberts, Jr.; George F. Helfrich

[57] ABSTRACT

A steering system for use in a towing vehicle-trailer combination, wherein all trailer axles are load bearing and fixed. The rearmost axle on the trailer has fixed wheel mountings, and serves as a pivot for turning the trailer when it moves in either a forward or reverse direction. The axle or axles located forward of the rearmost axle of the trailer and aft of the trailer king pin has or have directional wheels that automatically track and follow in concentric pattern the path of the rear wheels of the towing vehicle. The motive force for steering the directional wheels emanates from a sensor nested in the V-slot of the firth wheel of the towing vehicle. The steering system is designed to be installed as a retrofit to existing trailers, or as optional equipment for trailers not yet manufactured. Abling and disabling the system is automatic. Abling takes place when the fifth wheel is moved into position to couple the king pin under the trailer. The system is disabled whe locking lugs for the fifth wheel are released, and the fifth wheel moves away from the king pin.

12 Claims, 10 Drawing Sheets

PRIOR ART FIG. 1.

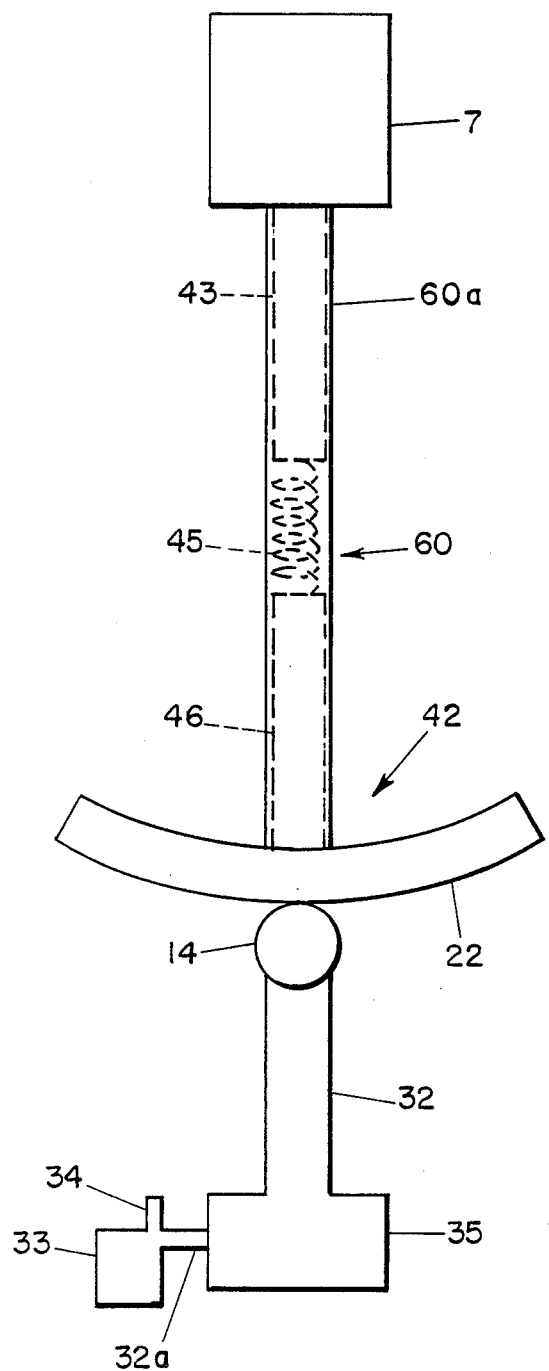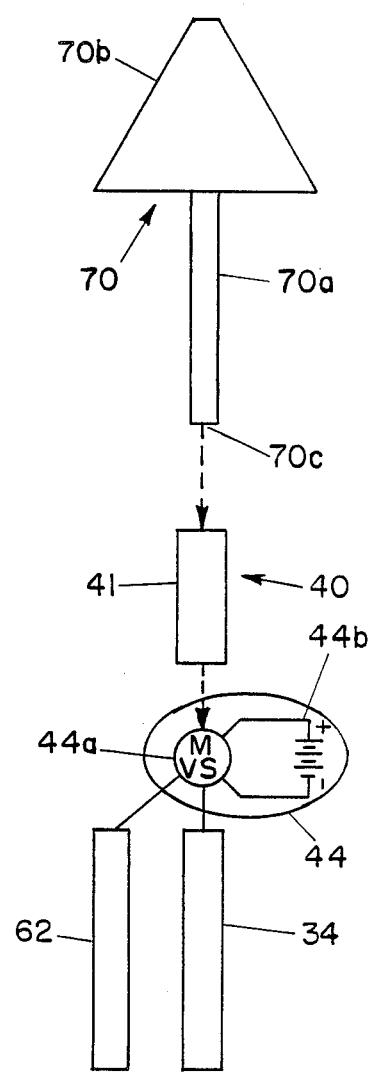
FIG. 13.
FIG. 3.

REMOTE-CONTROL STEERING SYSTEM

BACKGROUND OF THE INVENTION

The present invention relates to steering. More particularly, the invention relates to steering towed mobile vehicles by remote control.

As used herein, the term "axle" is defined as a shaft which connects wheels located on opposite sides of a frame which is supported by the shaft and by sorings connected thereto. The term "short axle" is defined as a shaft which connects a pair of wheels located on the same side of the frame. The term "spindle" is defined as a short conical shaft on which a wheel is mounted.

The term "fixed axle" is defined as an axle the orientation of which remains unchanged with respect to a frame which the axle supports. The term "steerable axle" is defined as an axle which is capable of changing direction with respect to and independently of a frame which the axle supports. The term "fixed wheel" is defined as a wheel the orientation of which remains unchanged with respect to an axle on which the wheel is mounted. The term "steerable wheel" is defined as a wheel which is capable of changing direction with respect to and independently of a fixed axle to which the wheel is connected by a spindle.

Trucks, tractors, and trailers are well described in the *Encyclopaedia Britannica,* volume 18, pages 721–723, hereby incorporated by reference.

Tractor-trailer combinations known as "eighteen-wheelers" present special problems. FIG. 1 shows a top plan view of an eighteen-wheeler generally denoted by the numeral 9. The frame 10 of a trailer 2 is supported near the front by the frame 7 of a tractor 1. The frame 7 is supported by a fixed front axle 4 provided with a pair of steerable wheels 3 mounted on a pair of spindles 6, and by two fixed rear axles 4, each of which is provided with two pairs of fixed wheels 3a. The trailer frame 10 is further supported by two fixed axles 4 near the rear of the trailer 2. Each of these rear axles 4 is likewise provided with two pairs of fixed wheels 3a. A "fifth wheel" 8 is fastened to the frame 7 of the tractor 1.

There are serious disadvantages inherent in the present design of eighteen-wheelers:

(1) Because the only axles supporting the frame 10 of the trailer 2 are the two rear axles 4, approximately half the weight of the trailer 2 is borne by the frame 7 of the tractor 1. An immediate consequence of this burden on the tractor 1 is that tractors pulling eighteen-wheelers must be large, heavy, and rugged enough to bear about half the weight of the trailer and of the payload, as well as the weight of the tractor itself. Clearly, if part of this extra weight could be borne by the trailer, it would be possible to utilize lighter and less expensive tractors. Furthermore, the portion of the fuel utilized to move the tractor could be considerably reduced, leading to even greater savings and to a significant advantage in fuel economy and energy conservation.

(2) Because there are only fixed wheels 3a supporting the trailer 2, it is impossible for the trailer 2 to turn without some of the wheels 3a skidding or dragging to some extent. The farther apart the rear axles 4, the more serious is the problem of wheel drag. This problem causes loss of control, wasteful loss of rubber from the tires mounted on the wheels 3a, and wasteful loss of the extra energy required to overcome sliding friction as opposed to rolling friction. The trailer 2 is unstable in a turn. The faster and sharper the turn, the greater the instability.

(3) The fifth wheel 8 of the tractor 1 furnishes a leg to support the front end of the trailer 2. However, it does not furnish full support for the full width of the front end of the trailer 2. This deficiency causes the bed (not shown) of the trailer 2 to rock down on one side and up on the other side. The extent to which such rocking occurs depends on the turns that the trailer 2 makes, the imbalance of the load (which can be caused by shifting of the cargo in transit), road conditions, and other variables. This particular type of instability is almost continuous while the eighteen-wheeler 9 is in motion.

(4) Often the longitudinal center of the trailer, when loaded, is in continual up-and-down motion. This motion contributes to the instability of the trailer 2, and may in extreme cases cause the trailer 2 to collapse at the longitudional center.

(5) The looseness of the trailer king pin (not shown) in the fifth wheel 8 of the tractor 1 causes some shock, which contributes to a deficiency in traction and to a rough ride for both cargo and driver.

(6) Tandem axles are not equivalent to two single axles. Transportation authorities do not allow as much weight to be carried by a pair of tandem axles as by a pair of single axles.

(7) Tandem axles on either the tractor 1 or the trailer 2, because they drag in a turn, can individually or in combination initiate a slide of the eighteen-wheeler 9 into a "jack-knife."

(8) The trailer 2 cannot independently furnish braking for the trailer 2 and its payload (not shown). The push of the trailer 2 against the tractor 1 when brakes are applied to the tractor 1 causes the tractor 1 to yaw.

(9) There is nothing between the trailer 2 king pin (not shown) and the rear axles 4 of the eighteen-wheeler 9 to function as a load-bearing stabilizer for the trailer 2. It is part of the function of the massive tractor 1 to counteract the sideward pull of the trailer 2 upon the tractor 1 when the tractor 1 changes direction at highway speeds. The sharper the turn, the greater is the pull.

(10) The existance of the problems just enumerated has caused the gradual emergence of heavier and massive tractors 1. These massive tractors 1 have larger engines. The role of the tractor 1 is to pull, to steer, and to give stable traction to the eighteen-wheeler 9 while carrying its cargo at highway speeds. The heavier tractors 1, along with Transporation Department load limits on tandem axles 4, cause the eighteen-wheeler 9 to carry less of a payload. The increased horsepower of the tractor 1 engines (not shown) causes less fuel efficiency. These factors, in combination, raise the cost per ton-mile of freight substantially.

In an attempt to alleviate these problems, prior-art devices have utilized steerable axles with fixed wheels for eighteen-wheelers; see, for example, U.S. Pat. Nos. 3,149,858, 3,533,644, 3,712,641, 3,734,538, 4,120,509, 4,244,596, and 4,463,966. Special devices have also been devised for steering goose-neck trailers, the devices including steerable short axles, wheels steered by friction against the road, and rear wheels forcibly steered from the fifth wheel of the tractor.

These prior-art devices are expensive to manufacture and maintain; and, because of their specialized design, of limited utility. Additionally, the devices and methods described in these patents are not effective for negotiating high-speed turns on highways and public streets.

They are, moreover, difficult to connect and disconnect. More specifically, when steerable axles are used to make a turn, the base of support provided by the axle is diminished proportionately to the degree of the turn.

SUMMARY OF THE INVENTION

In general, the present invention provides apparatus and method for transferring the direction of motion of a first mobile vehicle to an articulate second mobile vehicle. Thus, in one aspect, the invention provides apparatus whereby the first vehicle is used both to tow and to steer the second vehicle. All of the axles are crossmembers, extending across from one longitudinal member of the frame to the opposite longitudinal member of the frame. The axles directly support springs, and the springs support and are in direction and permanent attachment to the frames of the vehicles.

In the first embodiment, the apparatus includes means for sensing the direction of motion of the first vehicle. The apparatus further includes at least one pair of steerable wheels near the front end of the second vehicle. The steerable wheels are pivotally connected to a fixed axle, and are forcibly steered in response to the sensed direction of motion of the first vehicle. The steerable wheels provide independent support for the front end of the second vehicle for any direction of motion, and absorb changes of momentum caused by changes of speed and direction. The apparatus further includes means, at least some of which are electronic, for transmitting the direction of motion from the sensing means to the steerable wheels.

In a second embodiment, the apparatus includes means for sensing the direction of motion of the first vehicle. The apparatus further includes at least one pair of steerable wheels near the front end of the second vehicle. The steerable wheels are pivotally connected to a fixed axle, and are forcibly steered in response to the sensed direction of motion of the first vehicle. The steerable wheels provide independent support for the front end of the second vehicle for any direction of motion, and absorb changes of momentum caused by changes of speed and direction. The apparatus further includes a steering column for controlling the steerable wheels, means for transmitting the direction of motion from the sensing means to the steering column, and means for transmitting the direction of motion from the steering column to the steerable wheels.

In a third embodiment, the apparatus includes a directional sensor conformable to a slot in a fifth wheel fastened to a frame for the first vehicle. The directional sensor senses the direction of motion of the first vehicle. The apparatus further includes means for pressure-loading the sensor into the slot in the fifth wheel. The apparatus further includes at least one pair of steerable wheels near the front end of the second vehicle. The steerable wheels are pivotally connected to a fixed axle, and are forcibly steered in response to the sensed direction of motion of the first vehicle. They provide independent support for the front end of the second vehicle for any direction of motion, and absorb changes of momentum caused by changes of speed and direction. The apparatus further includes means for transmitting the direction of motion from the directional sensor to the steerable wheels.

In a fourth embodiment, the apparatus includes means for sensing the direction of motion of the first vehicle. The apparatus further includes at least one pair of steerable wheels near the front end of the second vehicle. The steerable wheels are pivotally connected to a fixed axle, and are forcibly steered in response to the sensed direction of motion of the first vehicle. They provide independent support for the front end of the second vehicle for any direction of motion, and absorb changes of momentum caused by changes of speed and direction. The apparatus further includes gearing means adapted to the particular geometry of the first and second vehicles for transmitting the direction of motion from the sensing means to the steerable wheels.

In a third aspect, the invention provides a method for automatically articulating a first steerable mobile vehicle to a second steerable mobile vehicle, and for disengaging the first and second mobile vehicles. The method includes the steps of (a) providing frames for the first and second vehicles; and (b) fastening a fifth wheel to the top of the frame of the first vehicle, and a king pin to the bottom of the frame of the second vehicle. The method further includes the step of (c) providing a directional sensor which can be pressure-loaded into the fifth wheel. The sensor is nested in a slot in the fifth wheel, and is responsive to the direction of motion of the first vehicle and of the fifth wheel. The method further includes the step of (d) disposing the sensor between the fifth wheel and a member fastened to the frame of the second vehicle. The method further includes the steps of (e) moving the first vehicle into position to couple the fifth wheel of the first vehicle to the king pin of the second vehicle, thereby pressure-loading the sensor into the slot of the fifth wheel, and coupling the fifth wheel to the king pin; and (f) locking the fifth wheel to the king pin, thereby articulating the first and second mobile vehicles. For disengaging the first and second vehicles, the method further includes the steps of (g) unlocking the fifth wheel from the king pin, and (h) moving the first vehicle away from the second vehicle.

In a fourth aspect, the invention provides a stabilized eighteen-wheeler with a steerable trailer. The stabilized eighteen-wheeler consists of (a) a tractor, (b) a trailer articulated to the tractor, (c) a directional sensor, and (d) means for transmitting the direction of motion of the tractor to the trailer. The tractor has a fifth wheel, and the directional sensor is disposed in a slot in the fifth wheel. The sensor senses the direction of motion of the tractor, and the sensed direction of motion of the tractor is transmitted to the steerable wheels of the trailer. In a first embodiment, the trailer has two pairs of steerable front wheels pivotally connected to a first fixed axle, and two pairs of fixed rear wheels mounted on a second fixed axle. In a second embodiment, the trailer has two pairs of steerable front wheels pivotally connected to a first fixed axle, two pairs of fixed rear wheels mounted on a second fixed axle, and two pairs of steerable wheels pivotally connected to a third fixed axle disposed between the first and second axles.

These and other aspects of the invention will be apparent to those skilled in the art from the foregoing description, and from the more detailed description which follows.

BRIEF DESCRIPTION OF THE DRAWINGS

FIG. 3 is a diagrammatic representation of a first embodiment of a power train for a trailer equipped in accordance with the principles of the present invention.

FIG. 13 is a diagrammatic representation of a third embodiment of a power train for a trailer equipped in accordance with the principles of the present invention.

DESCRIPTION OF THE PREFERRED EMBODIMENTS

As is well known, tractors which are used to pull trailers include a device known as a "fifth wheel." The fifth wheel is a slotted plate fastened to the frame above the tandem rear axles of the tractor. The slotted portion of the plate defines, approximately, the letter "V."

Figure 2:
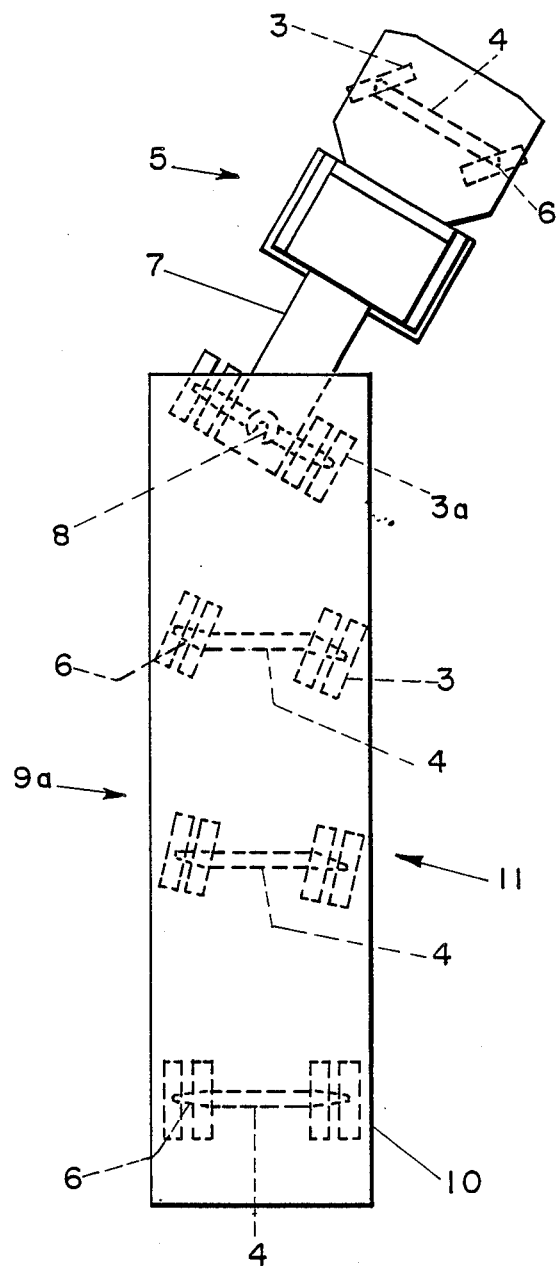
FIG. 2 is a top plan view of an eighteen-wheeler equipped in accordance with the principles of the present invention.

More specifically, FIG. 2 shows an eighteen-wheeler 11 equipped in accordance with the principles of the present invention. A tractor 5 includes a frame 7, a pair of steerable front wheels 3 mounted on spindles 6 and pivotally connected to a fixed axle 4, two pairs of fixed rear wheels 3a mounted on a fixed axle 4, and a fifth wheel 8 fastened to the frame 7. The tractor 5 is articulated to a trailer 9a equipped in accordance with the principles of the present invention. The trailer 9a includes four pairs of steerable wheels 3 pivotally connected to two fixed axles 4, and two pairs of fixed rear wheels 3a mounted on a fixed axle 4. The trailer 9a further includes a frame 10 which supports a body (not shown) such as, for example, a van, a flat bed, or a tank, for supporting or containing a payload. The steerable wheels 3 rotate on the spindles 6, which are hung from king pins (not shown) on each end of the fixed axles 4.

Figure 1:
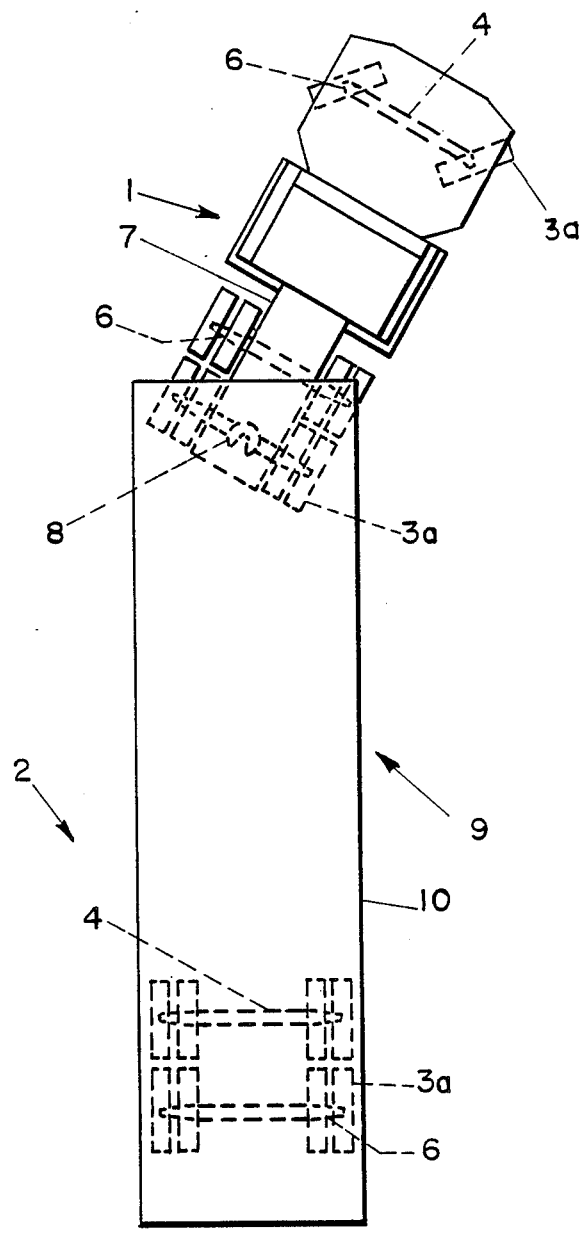
FIG. 1 is a top plan view of a tractor-trailer combination commonly known as an eighteen-wheeler.

By comparing FIGS. 1 and 2, it may be seen that the four pairs of steerable wheels 3 of the stabilized eighteen-wheeler 11 (FIG. 2) beneficially replace two pairs of fixed rear wheels 3a of the tractor 1 and two pairs of fixed rear wheels 3a of the trailer 2 (FIG. 1). This modification substantially solves and eliminates the problems previously described for conventional eighteen-wheelers, and offers the following advantages:

(1) More even distribution of weight and momentum when the tractor changes speed or direction of motion. This feature is particularly advantageous because of the forward location of the steerable wheels 3 and the fixed axles 4 to which the wheels 3 are pivotally connected.

(2) Greater stability in turns; safer turning capability and maneuvarability at high speeds. The higher the speed and the sharper the turn, the more important this aspect of the invention becomes. This feature represents an enormous serving with respect to driving time, and a tremendous safety asset for the prevention of overturning, "jack-knifing", and loss of control.

(3) Heavier pay loads borne safely by trailers modified and equipped according to the principles of the present invention. The increase in pay load is made possible by the use of lighter tractors, and by the replacement of tandem axles by single axles.

(4) Utilization of standard instead of specialized equipment. Steerable prior-art trailers are specially built, usually as a single unit and as special-purpose vehicles. The steering system of the present invention is designed to be installed as a retrofit to present-day state-of-the art trailers, or as optional equipment for trailers not yet manufactured.

(5) Automatic connecting and disconnecting of the steering system to and from the tractor. Prior-art systems are difficult to connect and disconnect, require special methods and equipment, and require a great deal of time.

(6) An eighteen-wheeler with five single axles. There are not tandem axles; hence the disadvantages and limitations of the tandem axles are eliminated. The axle or axles at or near the front end of the trailer span the entire width of the trailer, thereby providing positive and independent support for the front of the trailer. The front axle or axles reinforces or reinforce the support provided by the fifth wheel of the tractor. The steerable front wheels of the trailer absorb the pull to either side of the front of the trailer during turns. The front wheels act as a damper for the effect of looseness of fit of the trailer king pin in the fifth wheel of the tractor. The fixed, load-bearing axles located aft of the kin pin carry a substantial part of the trailer load, and eliminate or substantially reduce any vertical movement at the longitudional center of the trailer. The fixed, load-bearing axles near the front end of the trailer largely absorb the "dive" at the front of the trailer and the "lift" at the rear of the trailer during braking.

These features contribute to making the trailer 9a an independently-controlled vehicle. The weight limit allowable for an eighteen-wheeler with five single axles is greater than that for an eighteen-wheeler with tandem axles. A lighter tractor 5 with less fuel consumption can safely pull such an improved trailer 9a. In combination, these factors decrease the cost of fuel per ton-mile for hauling freight by a very significant amount.

FIG. 3 is a schematic illustration of a first embodiment 40 of a power train for transmitting the direction of motion from a first to a second vehicle. The direction of motion of the first vehicle is sensed by a sensor 70 and communicated to a microproicessor 41 by a first signal which the microprocessor 41 is programmed to receive. The microprocessor 41 then transmits a second signal indicative of the direction of motion of the first vehicle to a servomechanism 44 which controls a steering column 34 or steering arm 62. The steering column 34 or steering arm 62 controls the steerable wheels 3 of FIG. 2.

Although the servomechanism 44 may utilize hydraulic or pneumatic pressure, the servomechanism 44 preferably includes an electric motor 44a. Even more preferably, the motor 44a is a variable-speed, reversible electric motor. Power for operating the motor 44a may be provided, for example, by an electric battery 44b. Alternatively, the electric power may be provided, for example, by an electric generator which is part of the equipment of the first vehicle.

The motor 44e is responsive to the signal received from the microprocessor 41. More specifically, the signal transmitted by the microprocessor 41 to the servomechanism 44 controls the speed and direction of rotation of the rotor (not shown) in the motor 44a. The motor 44a controls the steering column 34 or the steering arm 62, which causes the wheels 3 to turn in accordance with the direction of motion of the first vehicle as sensed by the sensor 70, and with the particular geometry of the first and second vehicles.

The sensor 70 includes an extension 70a. Both first and second vehicles are provided with frames. One end 70b of the sensor 70 is fastened to the frame of the first vehicle, which is used to tow and steer the second vehicle. The other end 70c of the sensor 70 and of the extension 70a is attached to an electrical lead which makes electrical contact with a source of varying electrical potential (not shown). As the position of the sensor 70 changes in response to the motion of the first vehicle, the voltage contacted by the electrical lead attached to the extension 70a changes in a manner indicative of the position of the sensor 70. When the first vehicle is travelling in a straight line, the potential reading is zero. As the first vehicle begins a right turn, the voltage becomes positive, and the magnitude of the voltage is proportional to the degree of turn. When the turn has been completed, the voltage falls to zero. In a similar manner, when the first vehicle makes a left turn, the voltage assumes a negative value. By this mechanism an electrical signal is generated by the sensor 70, which signal is indicative of the direction of motion of the first vehicle. If desired, the electrical polarities may of course be reversed, the zero point displaced toward positive or negative polarity, or both.

Upon receiving the signal from the sensor 70, the microprocessor 41 sends a second signal to the servomechanism 44, the second signal likewise indicative of the direction of motion of the first vehicle. Either signal or both signals may be transmitted electrically or by radio waves. Electrical transmission comprises the use of an electrical conductor. If either signal is, or if both signals are transmitted by radio, the transmission system includes, for each signal, a modulator, a transmitter, a demodulator, and a receiver. The direction of displacement of the radio wave from the pull plane indicates the direction of motion, and the amplitude of the wave indicates the rate of motion of the first vehicle.

Figure 4:
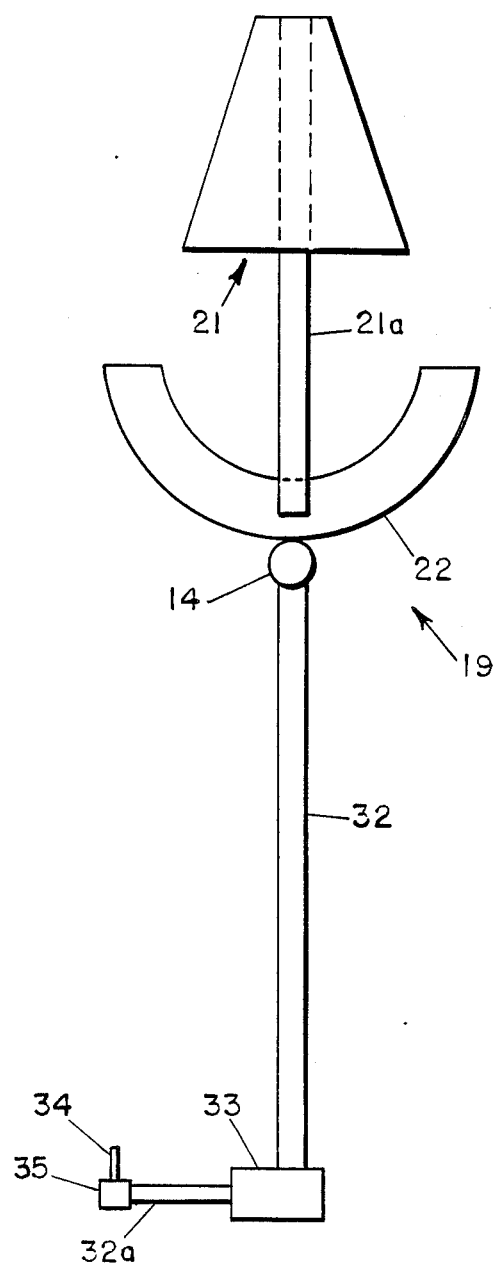
FIG. 4 is a top plan view, partly schematic, of a second embodiment of a power train for a trailer equipped in accordance with the principles of the present invention.

FIG. 4 illustrates the component parts of a second embodiment 19 of a power train which acts as a "sixth wheel" for a trailer equipped in accordance with the principles of the present invention. The power train 19 includes a directional sensor 21, disposed within the slot of the fifth wheel 8 of the tractor 5 (FIG. 2). The sensor 21 is pressure-loaded into the slot of the fifth wheel 8, preferably by pressure-loading the extension 21a against one of the other components of the power train 19, all of which are fastened directly or indirectly to the frame 10 of the trailer 9a (FIG. 2). Even more preferably, the sensor 21 is pressure-loaded into the slot of the fifth wheel 8 by pressure-loading the extension 21a against a first gear 22. While the first gear 22 is beneficially positioned as shown in FIG. 4, it will be clear to those skilled in the art that many other positions and modifications of the basic configuration shown are feasible within the scope of the present invention.

The first gear 22 is designed to control the steerable wheels 3 in accordance with the second direction of motion of the tractor 5 and with the geometry of the tractor 5 and trailer 9a (FIG. 2). The first gear 22 engages a second gear 14, the lower bevelled portion of which engages one end of a first shaft 32, which acts as a drive shaft. The other end of the drive shaft 32 is coupled to a second shaft 32a through a first gear-box 33. The shaft 32a is coupled to the steering column 34 through a second gearbox 35.

Figure 6:
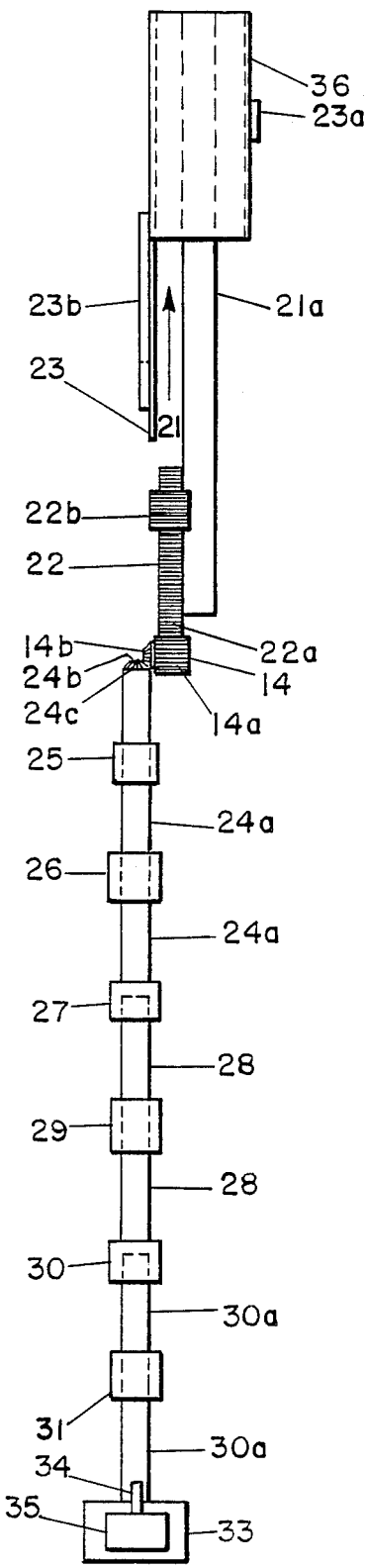
FIG. 6 is a side-elevational view of the power train shown in FIG. 5.
Figure 5:
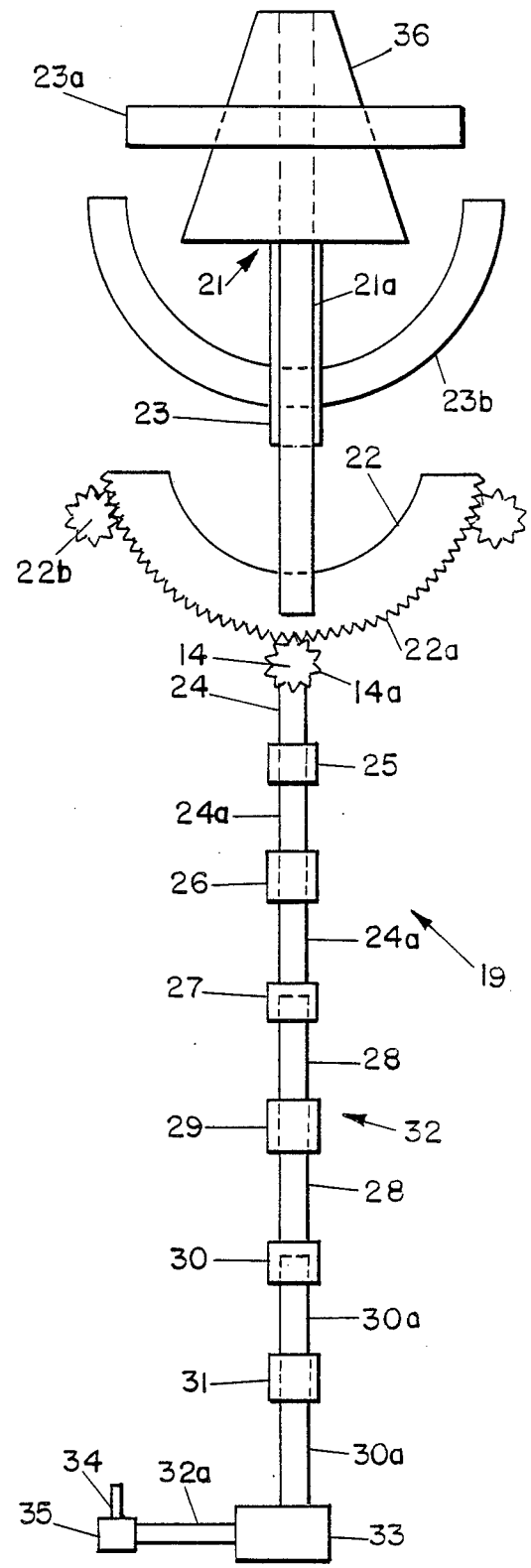
FIG. 5 is a more detailed top plan view of the power train shown in FIG. 4.

The detailed construction of the power train 19 is illustrated in FIGS. 5 and 6. The directional sensor 21 is held inside the slot of the fifth wheel 8 (FIG. 2) in a horizontal plane by biasing means (not shown), and in a vertical plane by a guide 23a. The biasing means serve the important function of maintaining the sensor 21 in pressurized, resilient contact with the outer surface of the wall of the slot in the fifth wheel 8. The extension 21a is supported by first and second support members 23 and 23b. The gear 22, which is supported by and cooperates with a pair of idling gears 22b, includes a first set of teeth 22a which mesh with a second set of teeth 14a on the upper portion of the bevelled second gear 14.

At its lower end, the bevelled gear 14 includes a third set of teeth 14b which mesh with a fourth set of teeth 24b on one end of a first segment 24 of the drive shaft 32. The first segment 24 is coupled to a second segment 24a by a spline 25, which prevents relative rotary movement of the segments 24 and 24a while permitting longitudional movement thereof. The segment 24a is provided with a first bushing 26 to stabilize the segment 24a of the drive shaft 32, and to limit the movement of the segment 24a in any direction except longitudinally. A first universal joint (U-joint) 27 is used to couple the second segment 24a to a third segment 28, which is also provided with a second bushing 29. A second U-joint 30 is similarly used to connect the third segment 28 to a fourth segment 30a of the drive shaft 32, the fourth segment 30a being provided with a third bushing 31. The first, second, third, and fourth segments 24, 24a, 28, and 30a comprise in combination the drive shaft 32 for the power train 19 which steers the trailer. The U-joints 27 and 30 allow for non-colinearity of the segments 24a, 28, and 30a.

The direction of motion is thus transmitted from the sensor 21 to the first gear 22 to the second gear 14 to the drive shaft 32 to the first gearbo 33 to the shaft 32a to the second gearbox 35 to the steering column 34. From the steering column 34 the direction of motion is transmitted to the steerable wheels 3 of the steering system for the trailer. The steering column extends slantingly downward to a steering box, which drives a relay; a tie; and steering arms (not shown). The steering system includes ball joints, knuckles, bearings, spindles, and other components (not shown) required for positive wheel alignment. Such devices and methods for functionally connecting a steering column to steerable wheels of a mobile vehicle are well known in the art;

see, for example, the McGraw-Hill *Encyclopedia of Science and Technology*, volume 1, pages 56, 746, 752, 753, and 755; volume 3, page 451; volume 5, page 526; and volume 13, pages 110–112, hereby incorporated by reference. The following brief description should therefore suffice. For a complete explanation, the McGraw-Hill encyclopedia should be consulted.

Figure 7:
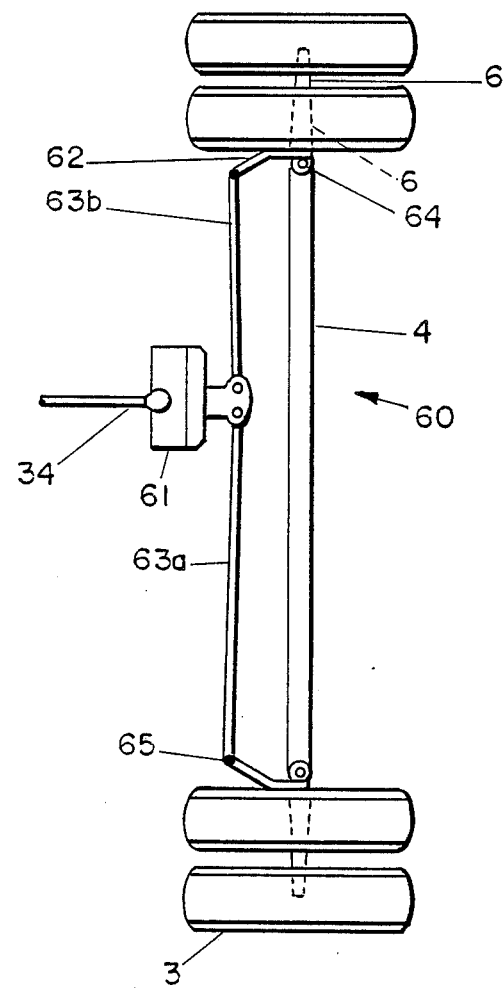
FIG. 7 is a schematic representation of part of a steering system for a trailer equipped in accordance with the principles of the present invention.

FIG. 7 represents schematically a steering system 60 for connecting the steering column 34 to the steerable wheels 3 of a trailer (not shown). The steering system 60 includes a steering gear 61, which connects the steering column 34 to tie-rod linkages 63a and 63b. The tie-rod linkages 63a, 63b, are coupled to steering arms 62 and spindles 6 by ball joints 65. The spindles 6 pivot on king pins 64, which are disposed in and oriented perpendicular to an axle 4. The steerable wheels 3 are mounted on the spindles 6.

The steering system 60 may be assisted by a power booster (not shown), thereby providing power steering for the trailer. The principal components of the power booster are a control valve, a power actuator, and a source of power. As the trailer follows a course determined and controlled by the steering system 60, the control valve senses any deviation between the prescribed position and the actual position of the steerable wheels 3, and releases power to the actuator until the deviation is corrected.

Figure 8:
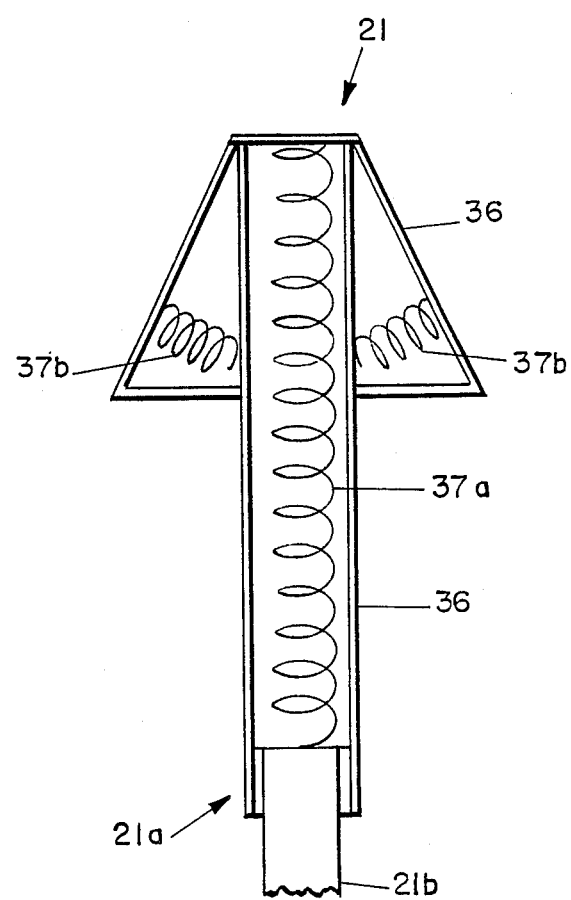
FIG. 8 is a top plan view of a horizontal section of a first embodiment of a directional sensor made in accordance with the principles of the present invention.

FIG. 8 shows the detailed construction of a first embodiment 21 of a directional sensor made in accordance with the principles of the present invention. The sensor 21 comprises a housing 36 and an extension 21a. The extension 21a includes part of the housing 36. Journalled within the extended portion of the housing 36 is a rigid, elongated member 21b which is fastened to the first gear 22 (FIGS. 4, 5, and 6). The extension 21a is spring-loaded against the first gear 22 by a first spring 37a, and against the inner slotted surface of the wall of the fifth wheel 8 by a pair of second springs 37b.

Figure 9:
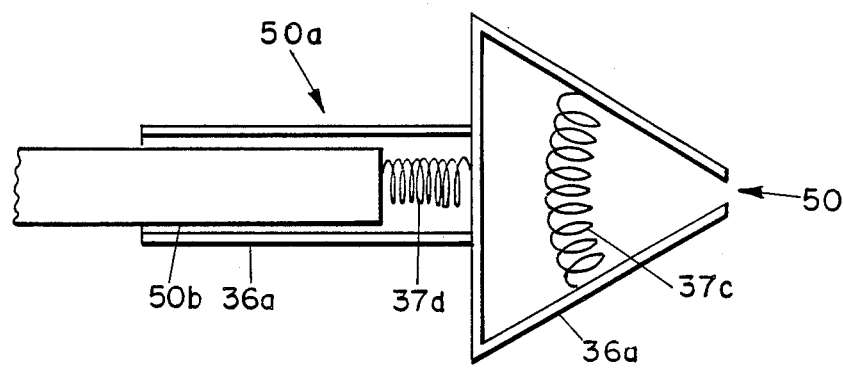
FIGS. 9 and 10 are top plan views of horizontal sections of a second embodiment of a directional sensor made in accordance with the principles of the invention, illustrating different configurations of the sensor.
Figure 10:
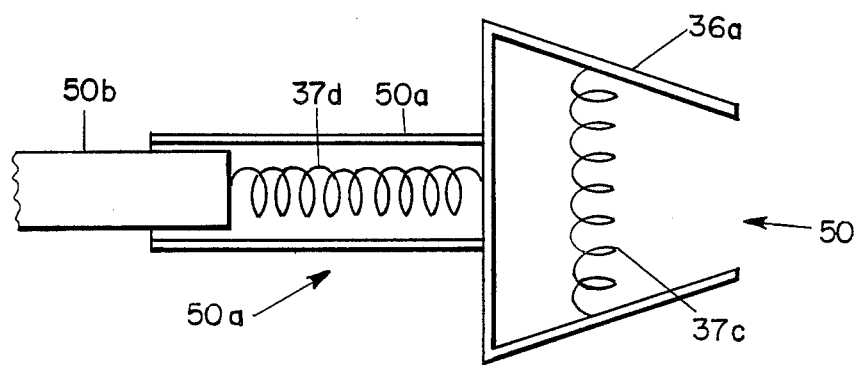

FIGS. 9 and 10 illustrate a second embodiment 50 of a directional sensor made in accordance with the principles of the present invention. The sensor 50 compises a housing 36a and an extension 50a. The extension 50a includes part of the housing 36a. Journalled within the extended portion of the housing 36a is a rigid, elongated member 50b which is fastened to the first gear 22 (FIGS. 4, 5, and 6). The extension 50a is spring-loaded against the first gear 22 (FIGS. 4, 5, and 6) by a first spring 37d, and against the inner slotted surface of the wall of the fifth wheel 8 by a second spring 37c. FIG. 9 depicts the sensor 50 after it has been spring-loaded into the fifth wheel 8. FIG. 10 shows the sensor 50 before it has been loaded, illustrating the biasing means comprising springs 37d and 37c.

Figure 11:
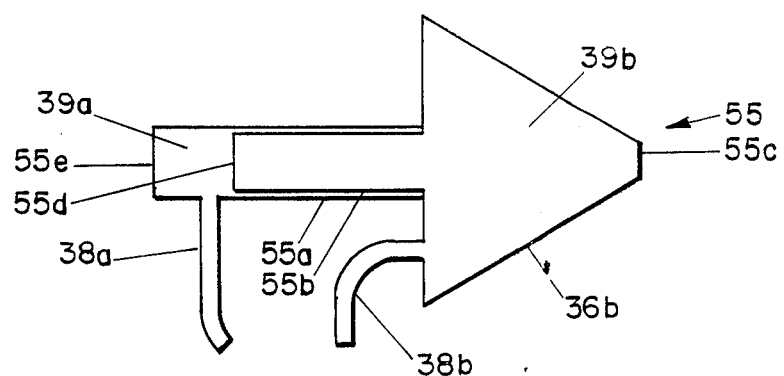
FIG. 11 is a top plan view of a horizontal section of a third embodiment of a directional sensor made in accordance with the principles of the invention.

Alternatively, the sensor may be pressure-loaded between the first gear 22 and the outer surface of the wall of the fifth wheel 8 by pneumatic or hydraulic pressure. FIG. 11 shows a third embodiment 55 of a directional sensor made in accordance with the principles of the present invention. The sensor 55 comprises a flexible housing 36b and extension 55a. The extension 55a is rigidly fastened at one end 55e to the first gear 22 (FIGS. 4, 5, and 6). The end 55e of the extension 55a is preferably closed, in order to ensure an air-tight seal. Journalled within the extension 55a is a close-fitting but freely movable tube 55b. One end of the tube 55b opens into the interior of the housing 36b. The other end of the tube 55b is closed. The length of the tube 55b is less than that of the extension 55a. The space enclosed by the housing 36b and extension 55a is thereby partitioned into first and second compartments 39a and 39b. The first compartment 39a extends from the closed end 55d of the tube 55b to the end 55e of the extension 55a. The second compartment 39b extends from one end 55c of the sensor 55 to the closed end 55d of the tube 55b.

The extension 55a is pressure-loaded against and between the first gear 22 and the outer surface of the wall of the fifth wheel 8 by pressurizing the first and second compartments 39a and 39b above atmospheric pressure. The pressure required to pressurize the compartments 39a and 39b is provided by admitting a pressurized fluid through first and second inlets 38a and 38b, respectively. The preferred fluid for this purpose is air.

The housing 36b is made of a flexible material such as poly(styrene). When the internal pressure becomes substantially greater than atmospheric, the housing 36b expands to conform to the slot in the fifth wheel 8. At the same time, the pressure exerted against the closed end 55d of the tube 55b causes the tube 55b and the housing 36b to move into pressurized contact with the wall of the slot in the fifth wheel 8.

Figure 12:
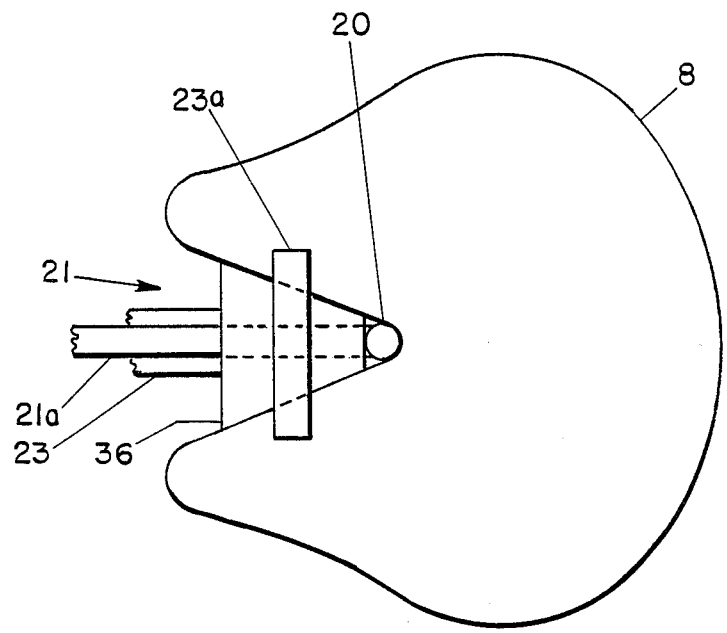
FIG. 12 is a top plan view of a fifth wheel, and of a directional sensor made in accordance with the principles of the present invention, showing the spatial relationship between the sensor and the fifth wheel.

FIG. 12 illustrates the "nesting" of the sensor 21 in the fifth wheel 8. While the sensor 21 has been used to illustrate the basic principle involved, it will be apparent to those skilled in the art that the same principle applies to the nesting of sensors 50 and 55.

The sensor is nested snugly in the V-slot of the fifth wheel 8 by biasing means such as springs 37a, 37b, 37c (FIGS. 8–10) or pneumatic or hydraulic pressure (FIG. 11). A king pin 20 is fastened to a plate (not shown), which is in turn fastened to the under surface of the frame 10 of the trailer 9a (FIG. 2). Inserting and removing the sensor into and from the fifth wheel 8 are automatic. Insertion takes place when the fifth wheel 8 is moved into position to couple the king pin 20 under the trailer 9a. The fifth wheel 8 is then locked to the king pin 20 by locking lugs (not shown). The sensor is removed from the fifth wheel 8 when the locking lugs are released, and the fifth wheel 8 moves away from the king pin 20.

While the invention has thus far been illustrated mostly for tractor-trailer combinations, it should be evident and is to be understood that trailers for boats, equipment, and the like are included in the scope of the invention. Likewise, although the details have so far been illustrated mostly in terms of tractors, it should be clear and is also to be understood that the first (towing) vehicle may be a truck, van, or automobile.

It is to be further understood that, while the sensor has been described, in the mechanical embodiment, as nesting in the V-slot of the fifth wheel of a tractor, other mechanical embodiments and arrangements are within the scope of the present invention. For example, a directional sensor could be coupled to the rear end of an automobile by means of a shaft or equivalent means. The same advantages which characterize the invention as applied to the larger tractor-trailer combinations are inherent in its application to the smaller trailers being towed by trucks or automobiles. Moreover, it is to be still further understood that the invention is applicable to a first trailer that is towed by a second trailer, the first and second trailers representing the first and second vehicles, respectively.

More specifically, FIG. 13 illustrates a third embodiment 42 of a power train of a trailer equipped in accordance with the principles of the present invention. The trailer (not shown) is coupled to the frame 7 of a towing vehicle such as an automobile or truck by a fourth embodiment 60 of a directional sensor. The directional sensor 60 comprises a rigid, hollow elongated member 60a which includes a first shaft 43 fastened to the frame 7, a second shaft 46 fastened to the first gear 22, and a spring 45 connecting the first and second shafts 43 and 46. The rest of the power train 42 functions in the same manner as the other embodiments of the power train previously described.

Figure 15:
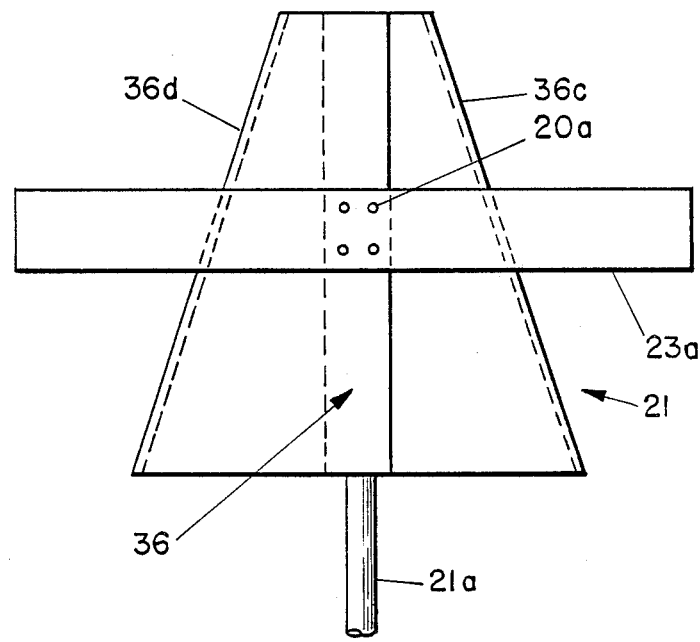
FIG. 15 is a top plan view of the external features of the sensor shown in FIGS. 4, 5, and 6, illustrating certain details not shown in FIGS. 4, 5, and 6.
Figure 14:
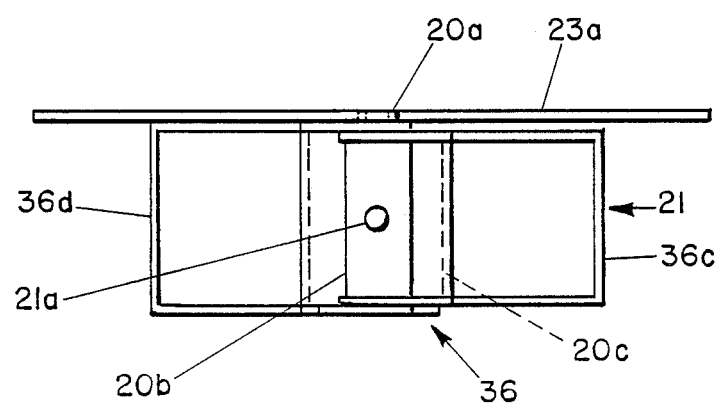
FIG. 14 is an end view, from the rear of the trailer, of the sensor shown in FIGS. 4, 5, and 6, illustrating certain details not shown in FIGS. 4, 5, and 6.

Further details of construction of the sensor 21 are illustrated in FIGS. 14 and 15. The top of the housing 36 comprises two portions, 36c and 36d. The guide 23a is fastened to the portion 36d by studs, bolts, or screws 20a. The extension 21a is supported and braced by first and second braces 20b and 20c.

While certain specific embodiments and details have been described to illustrate the principles of the present invention, it will be apparent to those skilled in the art that many modifications can be made therein without departing from the spirit and scope of the invention. As a further statement of intent, the inventor hereby declares his intention to relay on the "doctrine of equivalents" to determine and assess the fair scope of his invention as set forth and defined in the following claims.

I claim:

1. Apparatus for transferring the direction of motion from a first mobile vehicle to an articulated second mobile vehicle, comprising:
    (a) means for sensing the direction of motion of the first vehicle;
    (b) at least one pair of steerable wheels near the front end of the second vehicle, the steerable wheels pivotally connected to a fixed axle and forcibly steered in response to the sensed direction of motion of the first vehicle, to provide independent support for the front end of the second vehicle for any direction of motion, and to absorb changes of momentum caused by changes of speed and direction; and
    (c) means, including electronic means, for transmitting the direction of motion from the sensing means to the steerable wheels.

2. The apparatus of claim 1, wherein the means for sensing the direction of motion of the first vehicle include a directional sensor responsive to the direction of motion of the first vehicle, and wherein the means for transmitting the direction of motion from the sensing means ot the steerable wheels include:
    (d) steering means for controlling the direction of motion of the steerable wheels;
    (e) an electronically-controlled servomechanism for controlling the steering means; and
    (f) a microprocessor for receiving from the directional sensor a first signal indicative of the direction of motion of the first vehicle; and for transmitting to the servomechanism a second signal indicative of the direction of motion of the first vehicle, and of the geometry of the first and second vehicles.

3. Apparatus for transferring the direction of motion of a first mobile vehicle to an articulated second mobile vehicle, comprising:
    (a) means for sensing the direction of motion of the first vehicle;
    (b) at least one pair of steerable wheels near the front end of the second vehicle, the wheels pivotally connected to a fixed axle and forcibly steered in response to the sensed direction of motion of the first vehicle, to provide independent support for the front end of the second vehicle for any direction of motion, and to absorb changes of momentum caused by changes of speed and direction;
    (c) a steering column for controlling the steerable wheels;
    (d) means for transmitting the direction of motion from the sensing means to the steering column; and
    (e) means for transmitting the direction of motion from the steering column to the steerable wheels.

4. Apparatus for transferring the direction of motion of a first mobile vehicle to an articulated second mobile vehicle, comprising:
    (a) a directional sensor conformable to a slot in a fifth wheel, the first vehicle including a frame, the fifth wheel fastened to the frame of the first vehicle, for sensing the direction of motion of the first vehicle;
    (b) means for pressure-loading the directional sensor into the slot in the fifth wheel;
    (c) at least one pair of steerable wheels near the front end of the second vehicle, the steerable wheels pivotally connected to a fixed axle and forcibly steered in response to the second direction of motion of the first vehicle, to provide independent support for the front end of the second vehicle for any direction of motion, and to absorb changes of momentum caused by changes of speed and direction; and
    (d) means for transmitting the direction of motion from the directional sensor to the steerable wheels.

5. The apparatus of claim 4, wherein the directional sensor includes a housing and an extension, and wherein the means for pressure-loading the sensor into the fifth wheel include:
    (e) a frist spring disposed within the extension;
    (f) a rigid, elongated member for compressing the first spring; and
    (g) a second spring disposed within the housing, for maintaining the sensor in pressurized contact with the outer surface of the wall of the slot in the fifth wheel.

6. The apparatus of claim 4, wherein the means for pressure-loading the directional sensor into the fifth wheel include means for admitting a pressurized fluid into the interior of the sensor.

7. The apparatus of claim 4, wherein the sensor includes:
    (e) a flexible, substantially triangular member including first, second, third, and fourth sides, the first side defining a base of the triangular member, the second and third sides extending from the first to the fourth side, the fourth side defining an apex of the triangular member, the fourth side substantially shorter than the first, second, and third sides, the first side including an opening opposite the fourth side;
    (f) a sealed first hollow, elongated member extending from the first side of the triangular member away from the fourth side of the triangular member;
    (g) a close-fitting, freely-movable, flexible second hollow, elongated member disposed within the first hollow, elongated member, the second elongated member closed at one end, the other end open and continuous with the opening in the first side of the triangular member, the second elongated member substantially shorter than the first elongated member;

(h) a first compartment extending from the closed end of the second elongated member to one end of the first elongated member;
(i) a second compartment extending from the fourth side of the triangular member to the closed end of the second elongated member;
(j) a first inlet for admitting a pressurized fluid into the first compartment, thereby pressure-loading the sensor into the fifth wheel; and
(k) a second inlet for admitting a pressurized fluid into the second compartment, thereby inflating the housing and maintaining the sensor in pressurized contact with the outer surface of the wall of the slot in the fifth wheel.

8. Apparatus for transferring the direction of motion of a first mobile vehicle to an articulated second mobile vehicle, comprising:
(a) means for sensing the direction of motion of the first vehicle;
(b) at least one pair of steerable wheels near the front end of the second vehicle, the wheels pivotally connected to a fixed axle and forcibly steered in response to the sensed direction of motion of the first vehicle, to provide independent support for the front end of the second vehicle for any direction of motion, and to absorb changes of momentum caused by changes of speed and direction; and
(c) means, including gearing means adapted to the particular geometry of the first and second vehicles, for transmitting the direction of motion from the sensing means to the steerable wheels.

9. A stabilized eighteen-wheeler with a steerable trailer, consisting of:
(a) a tractor having a fifth wheel;
(b) a trailer articulated to the tractor, the trailer having two pairs of steerable front wheels pivotally connected to a first fixed axle, and two pairs of fixed rear wheels mounted on a second fixed axle;
(c) a directional sensor disposed within the fifth wheel, for sensing the direction of motion of the tractor; and
(d) means for transmitting the sensed direction of motion of the tractor to the steerable wheels of the trailer.

10. The eighteen-wheeler of claim 9, wherein the tractor has one pair of steerable front wheels pivotally connected to a third fixed axle, and two pairs of fixed rear wheels mounted on a fourth fixed axle.

11. A stabilized eighteen-wheeler with a steerable trailer, consisting of:
(a) a tractor having a fifth wheel;
(b) a trailer articulated to the tractor, the trailer having two pairs of steerable front wheels pivotally connected to a first fixed axle, two pairs of fixed rear wheels mounted on a second fixed axle, and two pairs of steerable wheels pivotally connected to a third fixed axle disposed between the first and second axles;
(c) a directional sensor disposed within the fifth wheel, for sensing the direction of motion of the tractor; and
(d) means for transmitting the sensed direction of motion of the tractor to the steerable wheels of the trailer.

12. The eighteen-wheeler of claim 11, wherein the tractor has one pair of steerable front wheels pivotally connected to a fourth fixed axle, and two pairs of fixed rear wheels mounted on a fifth fixed axle.

* * * * *